United States Patent
Qiu (10) Patent No.: US 11,573,657 B2
(45) Date of Patent: Feb. 7, 2023

(54) INTERACTIVE WHITE BOARD AND DATA PROCESSING METHOD AND DEVICE FOR SAME

(71) Applicants: GUANGZHOU SHIYUAN ELECTRONICS CO., LTD., Guangdong (CN); GUANGZHOU SHIZHEN INFORMATION TECHNOLOGY CO., LTD., Guangdong (CN)

(72) Inventor: Weibo Qiu, Guangdong (CN)

(73) Assignees: GUANGZHOU SHIYUAN ELECTRONICS CO., LTD., Guangzhou (CN); GUANGZHOU SHIZHEN INFORMATION TECHNOLOGY CO., LTD., Guangzhou (CN)

( * ) Notice: Subject to any disclaimer, the term of this patent is extended or adjusted under 35 U.S.C. 154(b) by 0 days.

(21) Appl. No.: 17/061,752

(22) Filed: Oct. 2, 2020

(65) Prior Publication Data
US 2021/0026488 A1    Jan. 28, 2021

Related U.S. Application Data

(63) Continuation-in-part of application No. PCT/CN2018/118240, filed on Nov. 29, 2018, and a
(Continued)

(30) Foreign Application Priority Data

Apr. 9, 2018 (CN) .......................... 201810311724.6
Apr. 9, 2018 (CN) .......................... 201810311967.X (51) Int. Cl.
G06F 3/041    (2006.01)
G06F 3/147    (2006.01)
G06F 3/0482   (2013.01)

(52) U.S. Cl.
CPC ............ *G06F 3/0416* (2013.01); *G06F 3/147* (2013.01); *G06F 3/0482* (2013.01)

(58) Field of Classification Search
None
See application file for complete search history.

(56) References Cited

U.S. PATENT DOCUMENTS

2012/0075213 A1* 3/2012 Huang ................ H04L 12/2814
                                                      345/173
2014/0115606 A1   4/2014 Hamzata et al.
(Continued)

FOREIGN PATENT DOCUMENTS

CN    103186323 A    7/2013
CN    105718111 A    6/2016
(Continued)

OTHER PUBLICATIONS

International Application No. PCT/CN2018/117050, International Search Report and Written Opinion dated Feb. 26, 2019, 11 pages.
(Continued)

*Primary Examiner* — Christopher R Lamb
(74) *Attorney, Agent, or Firm* — Zhong Law, LLC (57) ABSTRACT

An interactive white board, a data processing method and device for same are disclosed. The interactive white board includes a touch component, a device processor, a first control unit and multiple first channel modules, where the touch component is configured to generate first touch data and send it to the device processor; the device processor is configured to mark the first touch data according to a current display channel to generate second touch data and send it to the first control unit, where the second touch data includes an identifier corresponding to the current display channel; the first control unit is configured to send the second touch data to a corresponding one of the first channel modules according to the identifier corresponding to the current
(Continued)

display channel; and the first channel module is configured to receive the second touch data through the corresponding display channel and make a touch response.

18 Claims, 8 Drawing Sheets

Related U.S. Application Data continuation-in-part of application No. PCT/CN2018/117050, filed on Nov. 22, 2018.

(56) References Cited

U.S. PATENT DOCUMENTS

| | | | | |
|---|---|---|---|---|
| 2014/0145969 | A1* | 5/2014 | DeLuca | G09G 5/08 345/173 |
| 2016/0041629 | A1* | 2/2016 | Rao | H04N 21/443 348/734 |
| 2016/0041689 | A1 | 2/2016 | Yumoto et al. | |
| 2018/0173395 | A1* | 6/2018 | Lee | G06F 3/017 |

FOREIGN PATENT DOCUMENTS

| | | |
|---|---|---|
| CN | 106412655 A | 2/2017 |
| CN | 106990908 A | 7/2017 |
| CN | 107368272 A | 11/2017 |
| CN | 107451086 A | 12/2017 |
| CN | 108304040 A | 7/2018 |
| CN | 108845613 A | 11/2018 |
| CN | 208077056 A | 11/2018 |
| KR | 20130084002 A | 7/2013 |
| WO | 2017148412 A1 | 9/2017 |

OTHER PUBLICATIONS

International Application No. PCT/CN2018/118240, International Search Report and Written Opinion dated Feb. 27, 2019, 12 pages.
European Application No. 18914398.5, Extended European Search Report dated Sep. 9, 2021, 21 pages.

* cited by examiner

INTERACTIVE WHITE BOARD AND DATA PROCESSING METHOD AND DEVICE FOR SAME

CROSS REFERENCES

The present disclosure is a continuation-in-part of International Application No. PCT/CN2018/118240, filed on Nov. 29, 2018, which claims priority to Chinese Patent Application No. 201810311724.6, field on Apr. 9, 2018; and is a continuation-in-part of International Application No. PCT/CN2018/117050, filed on Nov. 22, 2018, which claims priority to Chinese Patent Application No. 201810311967.X, field on Apr. 9, 2018, the contents of the aforementioned applications are hereby incorporated by reference in their entireties.

TECHNICAL FIELD

The present disclosure relates to the field of interactive white boards, and in particular, to an interactive white board, and a data processing method and device for same.

BACKGROUND

Interactive white boards become more and more widely used in education and conferences. An interactive white board usually include multiple channel modules such as an Android module and a PC module. Therefore, when using different channel modules, it is necessary to send touch data to a corresponding module.

Figure 1:
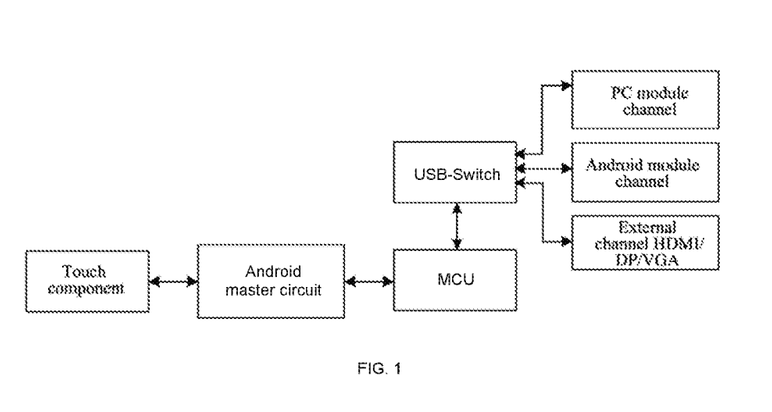
FIG. 1 is a schematic diagram of a system for distributing touch data.

A common way is to provide a USB-Switch switch situated between a channel module and a processor. FIG. 1 is a schematic diagram of a system for distributing touch data in some implementations. As shown in FIG. 1, distribution channels for touch data in this example include a PC module channel, an Android module channel, and external channels HDMI/DP/VGA, etc. The touch component is configured to generate the touch data, and the Android master circuit controls on-off between the USB-Switch and each channel using a microcontroller (MCU).

The problem in these implementations is that it takes excessive time due to the required re-enumeration a touch component when a touch display channel is switched through the USB switch. There is a need for effective solution to solve the practical problem.

SUMMARY

Embodiments of the present disclosure provide a data processing method, device and system for an interactive white board, and an interactive white board, which eliminates the need for re-enumerating the USB device when the touch display channel is switched, thereby improving user experience.

An embodiment of the present disclosure provides an interactive white board, including: a touch component, a device processor, a first control unit, and multiple first channel modules, where the touch component is connected to the device processor, the device processor is coupled to the touch component and the first control unit, and the first control unit is connected to the device processor and the at least two first channel modules, where:

the touch component is configured to generate first touch data and send the touch data to the device processor; the device processor is configured to mark the first touch data according to a current display channel to generate second touch data and send the second touch data to the first control unit, where the second touch data includes an identifier corresponding to the current display channel; the first control unit is configured to send the second touch data to a corresponding one of the first channel modules according to the identifier corresponding to the current display channel; and the first channel module is configured to receive the second touch data through the corresponding display channel and to make a touch response.

An embodiment of the present disclosure further provides a data processing method applied in an interactive white board, including: receiving first touch data generated by a touch component; marking the first touch data according to a current display channel of the interactive white board to generate second touch data, where the second touch data includes an identifier corresponding to the current display channel; sending the second touch data to a corresponding channel module according to the identifier corresponding to the current display channel; and receiving the second touch data and making a touch response.

According to embodiments of an interactive white board described in the disclosure, touch data is marked to enable a control unit to distribute the touch data to a corresponding channel module, and thus a connection relationship between the channel module and the control unit can be maintained, without the requirement of disconnection and reconnection through a switch, thereby solving the technical problem that the switching consumes excessive time due to the necessity of re-enumerating a touch component when a touch display channel is switched through a switch. Moreover, the touch component can be used immediately after the display channel is switched, further improving user experience.

BRIEF DESCRIPTION OF DRAWINGS

The drawings described herein are used to provide a further understanding of the application and constitute a part of the application. Exemplary embodiments of the application and description thereof are used to explain the application, and do not constitute an improper limitation of the application. In the attached drawings.

DESCRIPTION OF EMBODIMENTS

In order to enable those skilled in the art to better understand the solutions of the application, the technical solutions in the embodiments of the application will be clearly and completely described below in conjunction with the drawings in the embodiments of the application. The described embodiments are only part of the embodiments of the present disclosure, rather than all of the embodiments. Based on the embodiments in the present disclosure, all other embodiments generated by those of ordinary skill in the art without any creative effort should fall within the protection scope of the present disclosure.

It should be noted that the terms "first" and "second" in the description and claims of the application and the above-mentioned drawings are used to distinguish similar objects, and are not necessarily used to describe a specific sequence or sequence. It should be understood that data used in this way is interchangeable under appropriate circumstances, so that the embodiments of the present disclosure described herein can be implemented in a sequence other than those illustrated or described herein. In addition, the terms "including" and "having" and any variation of them are intended to cover non-exclusive inclusions. For example, processes, methods, systems, products, or devices that include a series of steps or units are not necessarily limited to those clearly listed steps or units, but may include other steps or units that are not clearly listed or that are inherent to these processes, methods, products, or devices.

Figure 2:
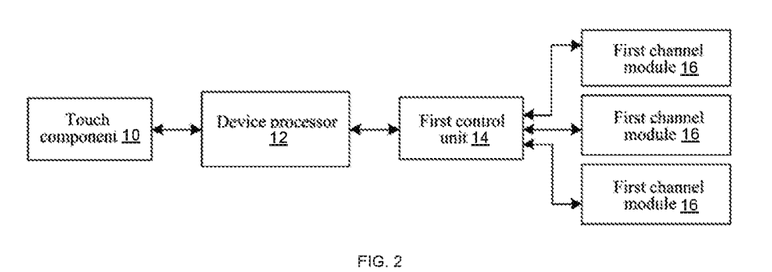
FIG. 2 is a schematic diagram of an interactive white board according to an embodiment of the disclosure.

As shown in FIG. 2, the interactive white board of this embodiment includes: a touch component 10, a device processor 12, a first control unit 14 and at least two first channel modules 16. The interactive white board may include devices such as a smart tablet with multiple modules, an all-in-one machine, a tablet computer, a monitor, or a smart TV. In this embodiment, the touch component 10 is connected to the device processor 12, the device processor 12 is connected to the touch component 12 and the first control unit 14, and the first control unit is connected to the device processor 12 and the more than one first channel modules 16.

The touch component 10 is configured to generate first touch data and send the first touch data to the device processor 12.

Optionally, the touch component 10 may be configured with functions such as electromagnetic touch, infrared touch, and capacitive touch. When a user operates the touch component 10, the touch component 10 generates first touch data.

The device processor 12 is configured to mark the first touch data according to a current display channel to generate second touch data, where the second touch data includes an identifier corresponding to the current display channel.

Optionally, device processor 12 is a master device processor of the system, which can be a processing circuit, such as an Android master circuit. The channel module can be a PC module, an Android module, an external module, etc., and the current display channel can be one or multiple in number. The Android master circuit is a circuit configured with logic operation functions that are native with the Android system. The interactive white board usually may provide two display systems at the same time, that is, the count of current display channels is two in number. For example, for an interactive white board with a sidebar, the sidebar can display the content output by the display channel of the device processor 12 (that is, the master circuit of the interactive white board, running an Android system), and the master interface can display the content output by the external display channel. The channel content displayed on the master interface can be switched from the first display channel to the second display channel. For example, the displayed content can be switched from the content output by the PC module to the content output by the Android system native to the Android master circuit, or the displayed content can be switched from the content output by the Android system native to the Android master circuit to the content output by the external module, or the displayed content can be switched from the content output by the external module to the content output by the PC module. There are many situations in which the displayed content can be switched, and there is no specific limitation here. At the same time, regarding how the device processor 12 implements the switching of the display channel, an optional implementation is provided here. Channel switching can be triggered by user operation or plug-in of an external display port (such as HDMI or Display Port). After the system service (OS Service) running in the processing circuit receives the user's channel switching operation, the system service (OS Service) will be determined according to the display channel selected by the user (such as HDMI2), and the system service (OS Service) calls the Open SDK channel switch interface in the processing circuit, and the Open SDK channel switch interface calls the system interface in the processing circuit to switch between different signal sources. After switching to the channel selected by the user, the processing circuit processes the display signal of the channel selected by the user (such as ratio conversion, color format conversion, signal format processing, etc.), and then outputs the processed display signal to the display device for display.

In an optional embodiment, the channel module may be associated with a corresponding identifier, the device processor may add the identifier of the channel module to the received first touch data for the first control unit 14 to recognize, and the marked touch data is the second touch data.

A first control unit 14, connected to the device processor 12, and is configured to distribute the second touch data to the display channel corresponding to the identifier in the second touch data.

Optionally, after receiving the second touch data, the first control unit 14 reads the identifier therein and determines, according to the identifier, the channel module to which the second touch data needs to be distributed.

In the above solution, there is no need to switch the communication relationship between the control unit and the channel module through the USB switch. Instead, the control unit distributes the touch data to the corresponding channel module according to the identifier without the need for a USB switch.

Multiple first channel modules 16 are connected to the first control unit 14 through corresponding data display channels, and are configured to receive the second touch data.

Optionally, the distribution of the touch data is controlled by the first control unit 14, and the first channel modules 16 directly maintain connection relationships with the first control unit 14 and only need to wait for the touch data.

It can be seen from the above that, in the above-mentioned embodiment of the present disclosure, touch data is marked to enable a control unit 14 to distribute the touch data to a corresponding channel module, and thus a connection relationship between the channel module and the control unit 14 can be maintained, without the requirement of disconnection and reconnection through a switch. Therefore, after the interactive white board is turned on again, there is no need to re-enumerate the USB device, thereby solving the problem that the USB switching consumes excessive time due to the necessity of re-enumerating a touch component when a touch display channel is switched through a switch. Moreover, the touch component can be used immediately after the display channel is switched, thereby improving user experience.

Optionally, according to the above embodiments of the present disclosure, the above interactive white board may include: two control units, that is, the first control unit and the second control unit. In an embodiment of the present disclosure, the interactive white board may include at least one second control unit.

Optionally, the second control unit is connected in series with the first control unit, and the second control unit is also connected to at least two second channel modules through corresponding display channels; where the first control unit is further configured to send the second touch data to the second control unit when the display channel corresponding to the second touch data is a display channel of any one of the second channel modules, and the second control unit is configured to send the received second touch data to a corresponding one of the second channel modules.

Figure 3A:
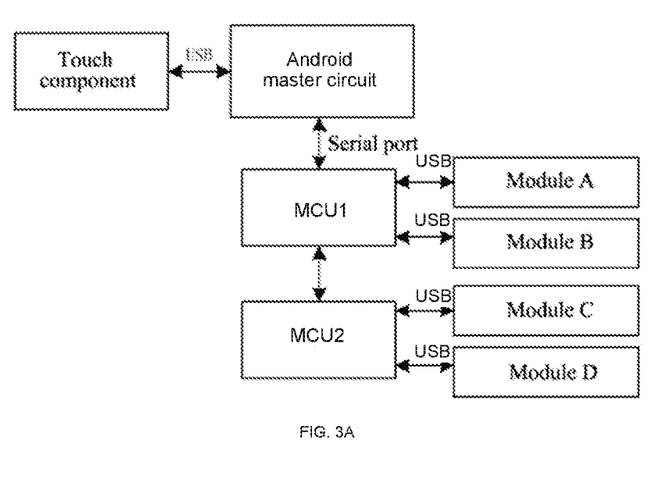
FIG. 3A is a schematic diagram of an optional interactive white board according to an embodiment of the disclosure.

As shown in FIG. 3A, the touch component is connected to the master circuit, and the Android master circuit (master device processor) is connected to MCU1 (first control unit), MCU1 is connected to module A and module B (multiple first channel modules). At the same time, MCU1 is also connected in series with MCU2 (second control unit), and MCU2 is connected with module C and module D (multiple second channel modules). When the identifier of the touch data is an identifier corresponding to module A or module B, MCU1 distributes the touch data to module A or module B. When the identifier of the touch data is an identifier corresponding to module C or module D, MCU1 distributes the touch data to MCU2, and MCU2 distributes it to module C or module D.

Optionally, the second control unit is connected in parallel with the first control unit, and the second control unit is also connected to at least two second channel modules through corresponding display channels; where the first control unit is further configured to send the second touch data to the second control unit when the display channel corresponding to the second touch data is a display channel of any one of the second channel modules, and the second control unit is configured to send the received second touch data to a corresponding one of the second channel modules (not shown in the figure).

The device processor 12 of the interactive white board sends the touch data to the control unit (the first or the second control unit), where the touch data includes identification information and touch information. After the control unit receives the touch data, it sends the touch data to a corresponding channel module according to the identification information, and the channel module can perform touch interaction. The identification information is preset information, that is to say, the user can preset the identification information according to actual needs, or change the identification information according to actual needs, so that when the channel module needs to be expanded, the identification information can be changed adaptively. Thereby, the channel modules can be easily expanded, and the effect of flexibly controlling which channel modules to output touch data to is achieved, and the purpose of flexibly controlling whether each channel module has touch data is realized. The interactive white board in the embodiment of the present disclosure can be flexibly used in scenarios having concurrent touches, that is to say, it can be flexibly used in scenarios where multiple or more channel modules require simultaneous touches.

In the embodiment of the application, since a control unit of the interactive white board sends touch data to a corresponding module according to the identification information, the device processor no longer needs to send touch data separately for each channel module, i.e., only one stream of touch data is sent, and the control unit sends the touch data to the corresponding channel module according to the identification information, thereby reducing the amount of data transmission between the device processor and the control unit and saving the communication bandwidth between the device processor and the control unit.

Various cascade modes are supported between control units of the interactive white board in the embodiment of the present disclosure, thereby improving the scalability of the interactive white board.

Figure 3B:
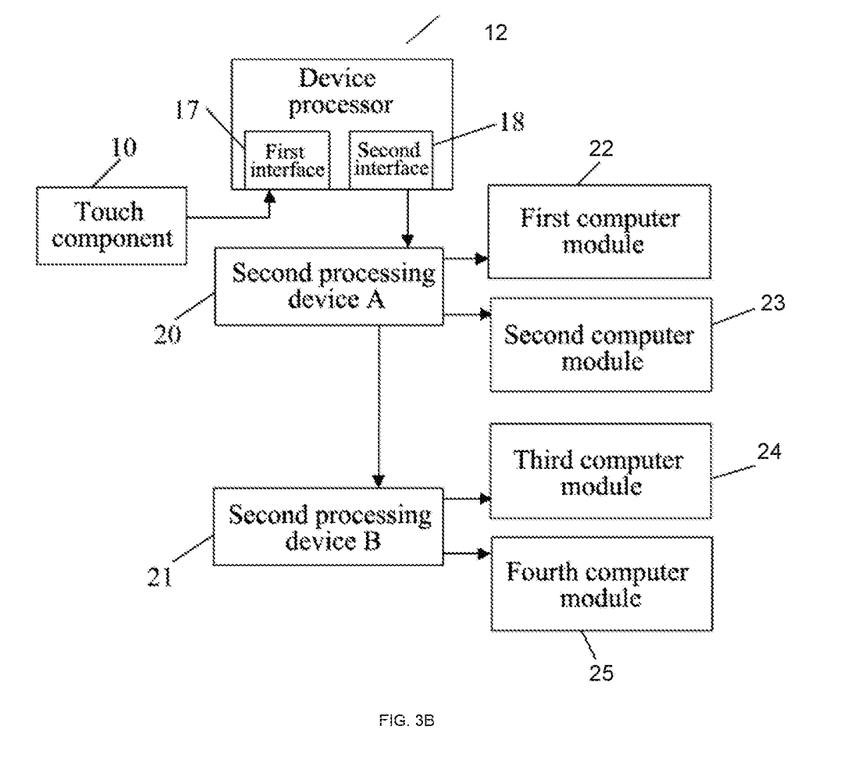
FIG. 3B is a schematic diagram of an optional interactive white board according to an embodiment of the disclosure.

In another embodiment of the present disclosure, as shown in FIG. 3B, the interactive white board further includes a device processor 12 including a first interface 17 and a second interface 18, where the first interface 17 is connected to the touch component 10 and the second interface 18 is connected to the first control unit 14. The first interface 17 and the second interface 18 may both be USB interfaces. The device processor 12 is configured to: if a current system is in a channel of the device processor 12, receive through the first interface 17 the touch data sent by the touch component 10 and process the touch data; and if the current system is in a corresponding channel of the first to fourth computer modules 22-25, receive through the first interface 17 the touch data sent by the touch component 10 and processes the touch data, and meanwhile forwards the processed touch data to the second interface 18, and sends the processed touch data to the second processing device A 20 through the second interface 18, and to second processing device B 21 through the second processing device A 20.

If the current system is in a channel of the first to fourth computer modules 22-25, and a menu application of the device processor 12 is triggered to display, the device processor 12 disables a data forwarding function of the second interface 18, and the device processor 12 receives, through the first interface 17, touch data sent by the touch component 10 and processes the touch data; and after the menu application of the device processor 12 exits, the data forwarding function of the second interface 18 is restored.

According to an embodiment of the present disclosure, an embodiment of a data processing method for an interactive white board is provided. It should be noted that the steps shown in the flowchart of the accompanying drawings can be executed in a computer system with a set of computer executable instructions, for example. Moreover, although a logical sequence is shown in the flowchart, in some cases, the steps shown or described may be performed in an order different from that here.

Figure 4:
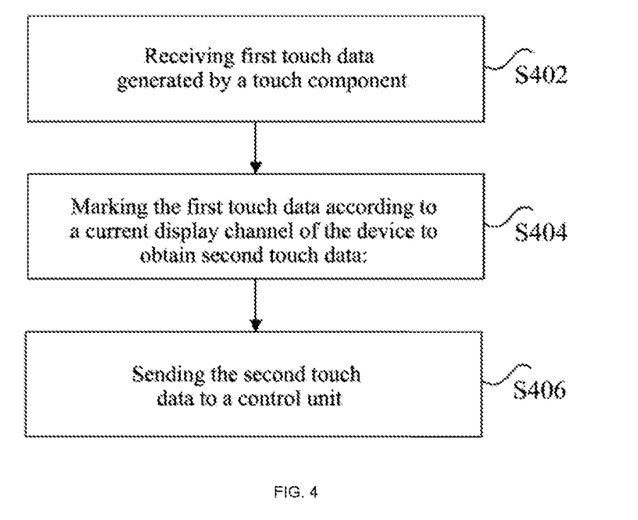
FIG. 4 is a flowchart of a data processing method for an interactive white board according to an embodiment of the disclosure.

FIG. 4 is a flowchart of a data processing method for an interactive white board according to an embodiment of the present disclosure. As shown in FIG. 4, the method includes the following steps:

Step S402: Receiving first touch data generated by a touch component.

Optionally, the steps in this embodiment may be executed by the device processor. The aforementioned touch component may be configured with functions such as electromagnetic touch, infrared touch, and capacitive touch. When the user operates the touch component, the touch component generates first touch data.

Step S404: Marking the first touch data according to a current display channel of the interactive white board to generate second touch data, where the second touch data includes an identifier corresponding to the current display channel.

Optionally, the channel module can be a PC module, an Android module, an external module, etc. In an optional embodiment, the marking the first touch data may include adding an identifier corresponding to the current display channel to the first touch data, where the adding position may be an identification bit in the data header of the first touch data, and the identification bit is configured to hold the identifier.

Step S406: Sending the second touch data to a control unit, where the control unit is further configured to distribute the second touch data to the corresponding display channel according to the identifier.

In the above steps, the device processor distributes the constructed second touch data to the control unit, and the control unit distributes the second touch data according to the identifier.

In an optional embodiment, after receiving the second touch data, the control unit reads the identification bit of the second touch data, and distributes the second touch data to a corresponding channel module according to the corresponding relationship between the identifier and the channel module. After receiving the second touch data, the channel module makes a touch response.

It can be seen from the above that, in the above embodiments of the present disclosure, first touch data generated by a touch component is received, and the first touch data is marked according to a current display channel of a channel module currently running on the interactive white board to generate second touch data, where the second touch data includes an identifier corresponding to the current display channel, and the second touch data is sent to a control unit, where the control unit is further configured to distribute the second touch data to the corresponding channel module according to the identifier. Through marking the touch data and distributing the touch data to a corresponding channel module according to an identifier corresponding to a current display channel, a connection relationship between the channel module and the control unit can be maintained without the requirement of disconnection and reconnection through a switch. Therefore, after the interactive white board first enumerates the touch component when it is turned on, there is no need to re-enumerate the USB device, thereby solving the existing technical problem that the switching consumes excessive time due to the necessity of re-enumerating a touch component when a touch display channel is switched through a switch. Moreover, the touch component can be used immediately after the display channel is switched, thereby improving user experience.

Optionally, according to the embodiment of the present disclosure, the receiving the first touch data generated by the touch component includes:

Step S4021: Enumerating the touch component.

Optionally, part of an HID-CORE file can be driven by an HID (Human Interface Device) to enumerate the touch component.

Step S4023: Selecting data generated by the touch component out of the received data according to a device identifier of the touch component.

Optionally, the above-mentioned device identifier may include a PID (Product ID, product ID) and VID (Vendor ID, manufacturer ID), where different USB devices have different PIDs/VIDs, therefore, the device processor can identify the data from the touch component according to the PID/VID.

Step S4025: Selecting, according to characteristic information of touch data, the touch data out of the data generated by the touch component as the first touch data.

Optionally, the above-mentioned characteristic information includes a report ID and a data length. The report ID is configured to indicate the type of data. Therefore, the device processor can select out the touch data according to the type of data as the first touch data.

Optionally, according to the foregoing embodiment of the present disclosure, the channel module has a corresponding identifier, and the marking the first touch data according to the current display channel of the interactive white board to generate the second touch data includes:

Step S4041: Determining, according to the current display channel of the interactive white board, an identifier for marking the first touch data.

In an optional embodiment, the device processor is pre-stored with a corresponding relationship between the display channel and the identifier, and the device processor can determine its identifier after determining the current display channel of the interactive white board.

Step S4043: Marking the first touch data according to the identifier to generate the second touch data.

In an optional embodiment, the identifier of the first touch data may be stored in the header of the data packet of the first touch data.

Optionally, according to the embodiment of the present disclosure, before determining the identifier for marking the first touch data according to the current display channel, the method further includes:

Step S4045: Detecting whether the display channel changes, where the display channel changes when the interactive white board switches a channel module.

Optionally, when the user switches the channel module, the display channel of the interactive white board changes. In an optional embodiment, taking a smart interactive white board as an example, the smart interactive white board has multiple types of channel modules, such as an Android module and a PC module, so as to provide multiple types of systems. When using the smart interactive white board, the user can perform system switching. When the user performs the system switching, the device processor detects that the display channel changes.

Step S4047: In case the display channel changes, detecting whether a last set of touch data before the display channel changes is in its integrity.

Optionally, the last set of data before the display channel changes is data about the last touch event before the display channel changes. A set of touch events has a flow of down-move-move . . . -move-up. In case the data about the set of touch events is in its integrity, it includes a start point data packet (down point data packet), a control point data packet (multiple move point data packets), and an end point data packet (up point data packet); and in case the touch events lack the start point data packet or the end point data packet, the touch data is not in its integrity.

Step S4049: If the last set of touch data before the display channel changes is not in its integrity, using supplementary points to supplement an end point of the last set of touch data before the display channel changes and a start point of the first set of touch data after the display channel changes, where the supplementary points are first touch points after the display channel changes.

Optionally, although the first set of touch events after the display channel changes do not have the down point data packet, the touch component can still receive the touch data, so the touch data of the first touch point received after the touch component is switched is used as both the up point data packet of the last set of touch events before the display channel changes and the down point data packet of the first set of touch events after the display channel is switched, so as to complement the two sets of touch events which are not in their integrity.

Figure 5:
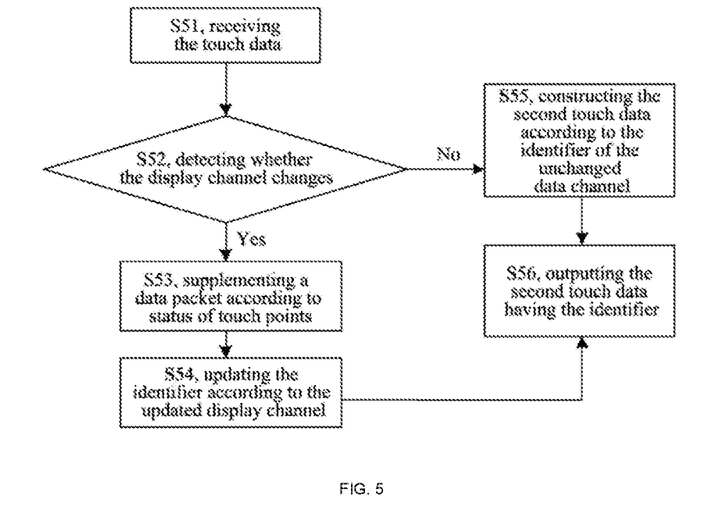
FIG. 5 is a flowchart of processing first touch data by a device processor according to an embodiment of the disclosure.

FIG. 5 is a flowchart of processing first touch data by a device processor according to an embodiment of the present disclosure. The above solution will be described below with reference to FIG. 5.

Step S51: Receiving the touch data.

Step S52: Detecting whether the display channel changes. In case that the display channel changes, proceed with step S53, otherwise proceed with step S55.

Step S53: Supplementing a data packet according to status of touch points.

Optionally, for the above step, the data packet may be supplemented in a manner as described in step S4049, so that the touch events before and after the display channel changes are completely supplemented.

Step S54: Updating the identifier according to the updated display channel.

In the above steps, since the channel module is switched, the display channel needs to be updated. Each channel module corresponds to a different identifier. Therefore, the identifier of the updated channel module and the first touch data are used together to construct the second touch data.

Step S55: Constructing the second touch data according to the identifier of the unchanged display channel.

Step S56: Outputting the second touch data having the identifier.

In the above step S56, the second touch data is output to the control unit, and is distributed by the control unit to the corresponding channel module according to the identifier.

Optionally, according to the above embodiment of the present disclosure, the determining, according to the current display channel of the interactive white board, the identifier for marking the first touch data includes:

Step S40411: Acquiring a target bit corresponding to the current display channel of the interactive white board, where the identifier includes multiple bits, and each bit corresponds to a channel module.

In an optional embodiment, the identifier may be one byte, which includes eight bits, and the data of each bit may indicate the corresponding channel module. The target bit is a currently running channel module, i.e., a channel module that needs to receive the touch data.

It should be noted that if there are many channel modules, the identifier can be set to two bytes usable by 16 channel modules.

In step S40413: Setting a value of the target bit in the identifier to be opposite to a value of a remaining bit to generate the identifier for marking the first touch data.

In the above step S40413, if the value of the remaining bit is 0, the value of the target bit may be 1, and if the value of the remaining bit is 1, the data of the target bit may be 0. After each bit in the identifier is set to a corresponding value, the identifier of the first touch data is generated.

In an optional embodiment, as shown in FIG. 3A, the identifier is of 1 byte (8 bits), each bit represents the output of one channel module, the 0-th bit represents a USB bypass of channel module A; the 1-st bit represents a USB bypass of channel module B, and so on.

When channel modules A, B, C, and D all need touch data, set the identifier to 0x0F (hexadecimal number, the corresponding binary is 00001111), and the MCU judges whether to output USB touch data according to the identification bit.

In the case that only channel module A needs the touch data, the identifier is set to 0x01 (hexadecimal number, the corresponding binary is 00000001), and the MCU determines whether to output USB touch data according to the identification bit.

In an implementation of the present disclosure, if the identification information is 0x0F (hexadecimal number, the corresponding binary is 00001111), MCU1 sends touch data to channel modules A and B, and MCU2 sends touch data to channel modules C and D; if the identification information is 0x02 (hexadecimal number, the corresponding binary is 00000010), MCU1 sends the touch data to channel module B, and so on.

The interactive white board of this embodiment can be used in scenarios having concurrent touches (the channel modules A, B, C, and D all need touch data). After MCU1 and MCU2 receive identification information and touch data, they send the touch data to corresponding channel modules according to the identification information, where the identification information can be preset information. The user can preset or modify the identification information according to actual needs, therefore achieving the effect of flexibly controlling the output of data to the corresponding channel module, and easily expanding the channel module.

Optionally, according to the above embodiment of the present disclosure, after enumerating the touch component, the method further includes:

Step S4010: Using the first touch data to drive an input subsystem.

Optionally, the above input subsystem may be an INPUT subsystem in a device processor of the system, which is configured to manage a touch event received by the interactive white board.

Step S4012: Responding to the first touch data.

In the above step S4012, the first touch data reads the touch event from the system processor and executes it.

Figure 6:
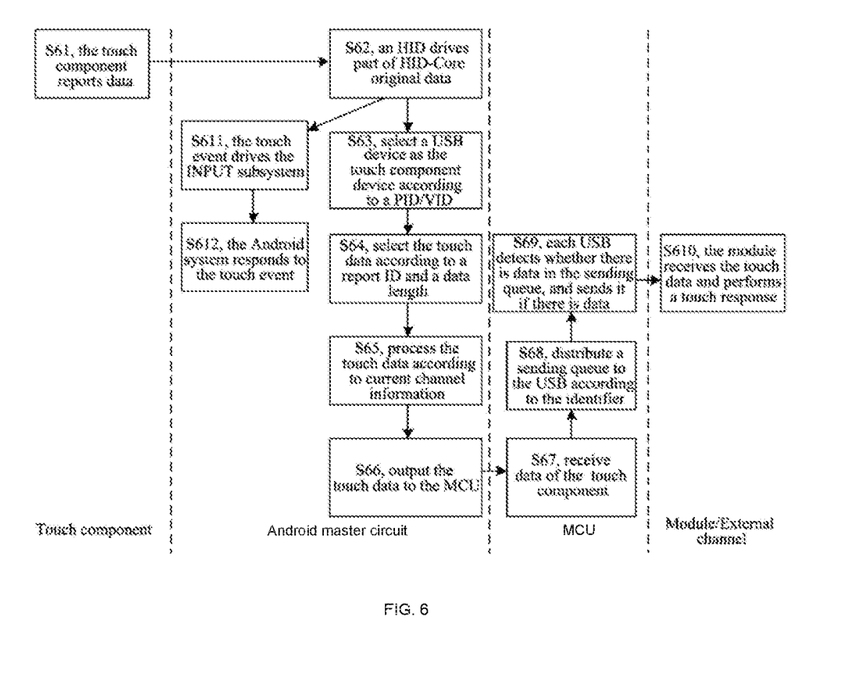
FIG. 6 is a data interaction diagram of an optional touch event according to an embodiment of the disclosure.

FIG. 6 is a data interaction diagram of an optional touch event according to an embodiment of the present disclosure. The data flow of the touch event will be described below with reference to FIG. 6. Touch data circulates in the touch component, Android master circuit (device processor), MCU (control unit), and PC module/external channel (channel module).

Step S61: The touch component reports data.

Optionally, when the user touches the touch component or touches the touch component with a stylus, the touch component generates touch data and sends the touch data to the device processor.

Step S62: An HID (Human interface device) drives part of HID-CORE original data.

Optionally, the above step S62 is used to enumerate the touch component.

Step S63: Select a USB device as the touch component according to a PID/VID.

Optionally, the device processor can be connected to a variety of USB devices, and each USB device is associated with a corresponding PID (Product ID, product ID) and VID (Vendor ID, manufacturer ID), so that the touch component can be identified by the PID/VID.

Step S64: Select out the touch data according to a report ID and a data length.

In the above steps, the report ID and the data length are the characteristic information of the touch data, and the Android master circuit selects the touch data out of various data according to the data characteristic of the touch data.

Step S65: Process the touch data according to current channel information.

Optionally, the current channel information is channel information of the currently running channel module, and each channel module corresponds to a corresponding identifier. Therefore, step S65 may be determining the identifier of the current channel, and adding the identifier of the current channel as a data header to the touch data. The specific processing flow can be shown in FIG. 5.

Step S66: Output the touch data to the MCU.

After step S65, the Android master circuit sends the touch data added with the identifier to the MCU, and the MCU performs distribution to the channel module.

Step S67: Receive data of the touch component.

In the above step S67, the MCU receives the touch component data transmitted by the Android master circuit.

Step S68: Distribute a sending queue to the USB according to the identifier.

Optionally, each channel module has a corresponding sending queue. In the above steps, the MCU extracts an identifier from the touch data, determines, according to the identifier, a channel module to which the identifier needs to be sent, and then sends the touch data to the sending queue of the channel module so that each channel module that needs touch data can receive the touch data, while a channel module that does not need touch data will not receive the touch data.

Step S69: Each USB detects whether there is data in the sending queue, and sends it if the data exists.

Optionally, the display channel of each channel module has a corresponding sending queue for storing the received touch events, and the touch events in the sending queue are sent to the channel module in sequence according to the received order.

Step S610: The channel module receives the touch data and performs a touch response.

Step S611: The touch event drives the INPUT subsystem.

Optionally, the aforementioned INPUT subsystem is configured to manage a touch event received by the Android master circuit.

Step S612: The Android system responds to the touch event.

According to an embodiment of the present disclosure, an embodiment of a data processing method for an interactive white board is provided. It should be noted that the steps shown in the flowchart of the accompanying drawings can be executed in a computer system with a set of computer executable instructions, for example. Moreover, although a logical sequence is shown in the flowchart, in some cases, the steps shown or described may be performed in an order different from that.

Figure 7:
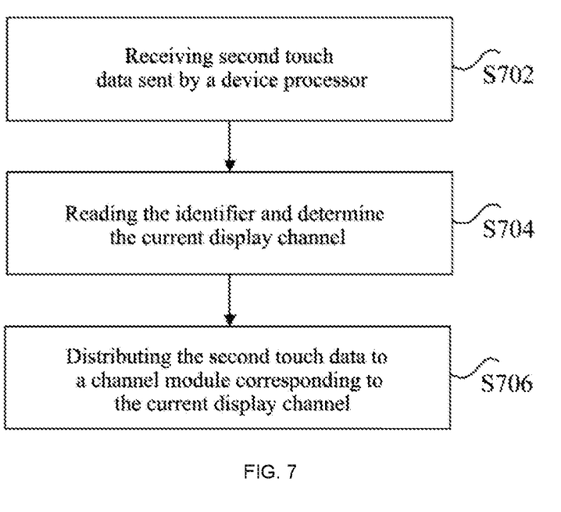
FIG. 7 is a flowchart of a data processing method for an interactive white board according to an embodiment of the disclosure.

FIG. 7 is a flowchart of a data processing method for an interactive white board according to an embodiment of the present disclosure. The data processing method for the interactive white board provided in this embodiment can be applied to the interactive white board in Embodiment 1. As shown in FIG. 7, the method includes the following steps:

Step S702: Receiving second touch data sent by a device processor, where the second touch data includes an identifier corresponding to a current display channel of the interactive white board.

Optionally, the steps in this embodiment may be executed by the first control unit as described above. The second touch data is generated by the device processor according to the identifier of the currently running channel module and the first touch data.

Step S704: Reading the identifier and determining the current display channel.

Specifically, due to the corresponding relationship between the identifier and the display channel, the control unit may determine the channel module corresponding to the touch data according to the identifier.

Step S706: Distributing the second touch data to a channel module corresponding to the current display channel.

After generating the second touch data, the channel module can respond to the second touch data.

It can be seen from the above that, in the foregoing embodiment of the present disclosure, second touch data sent by a device processor is received, where the second touch data includes an identifier corresponding to a current display channel; the identifier is read and the current display channel is determined; and the second touch data is distributed to a channel module corresponding to the current display channel. According to the above solution, touch data is marked to enable a control unit to distribute the touch data to a corresponding channel module, and thus a connection relationship between the channel module and the control unit can be maintained without the requirement of disconnection and reconnection through a switch. Therefore, after the interactive white board first enumerates the touch component when it is turned on, there is no need to re-enumerate the USB device, thereby solving the existing technical problem that the switching consumes excessive time due to the necessity of re-enumerating a touch component when a touch display channel is switched through a switch. Moreover, the touch component can be used immediately after the display channel is switched, thereby improving user experience.

Optionally, according to the foregoing embodiment of the present disclosure, the distributing the second touch data to the channel module corresponding to the current display channel includes:

Step S7061: Sending the second touch data to a data queue of the channel module.

Step S7063: Sequentially distributing the second touch data in the data queue to the channel module.

Figure 8:
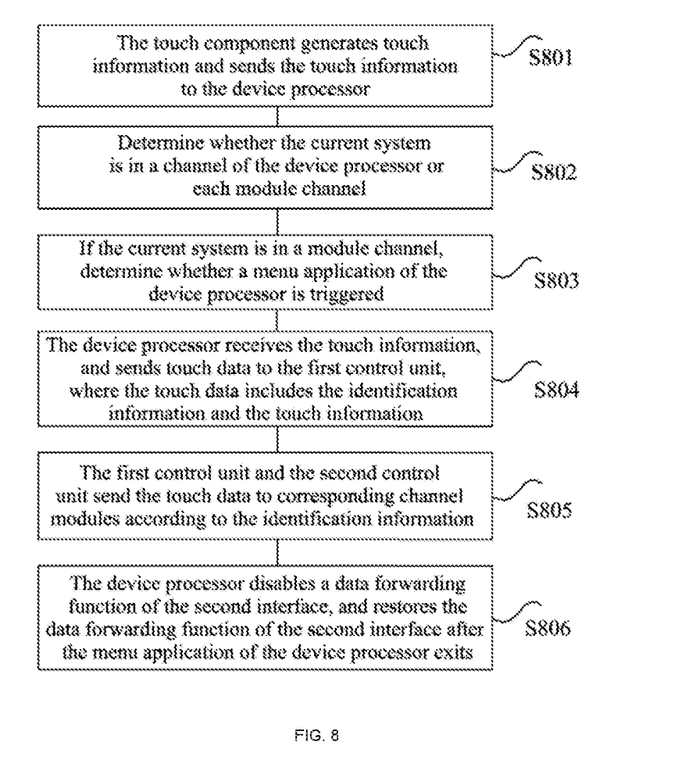
FIG. 8 is a flowchart of a data processing method for an interactive white board according to an embodiment of the disclosure.

According to an embodiment of the present disclosure, provided is a data processing method applied in an interactive white board, where the interactive white board includes: a touch component 10, a device processor 12, a first control unit 14, and at least two first channel modules 16. The touch component 10 is connected to the device processor 12, the device processor 12 is connected to the touch component 10 and the first control unit 14, and the first control unit 14 is connected to the device processor 12 and the at least two first channel modules 16. The touch component 10 generates first touch data and sends the touch data to the device processor 12; the device processor 12 marks the first touch data according to a current display channel to generate second touch data, and sends the second touch data to the first control unit 14, where the second touch data includes an identifier corresponding to the current display channel. The first control unit 14 sends the second touch data to a corresponding one of the first channel modules according to the identifier corresponding to the current display channel, and the first channel module 16 receives the second touch data through the corresponding display channel and makes a touch response.

The data processing method of this embodiment also includes:

Step S800: The touch component 10 generates touch information and sends the touch information to the device processor 12. In an embodiment of the present disclosure, when the user touches or uses a stylus to touch the touch component 10, the touch component 10 generates touch data and sends the touch data to the device processor 12.

Step S801: Determine whether the current system is in a channel of the device processor 12 or each module channel. In an embodiment of the present invention, the device processor 12 may be the master system, the channel module may be a PC module, an Android module or an output module, and the current system refers to a currently used system.

Step S802: If the current system is in a channel of the device processor 12, the device processor 12 receives the touch information through the first interface 17 and processes the touch information. In an embodiment of the present disclosure, if the current system is in a channel of the device processor 12, that is, the current user is using the device processor 12, the device processor 12 receives the touch information sent by the touch component 10 through the first interface 17 and processes the touch information.

Step S803: If the current system is in the first channel module 16, determine whether a menu application of the device processor 12 is triggered. In an embodiment of the present disclosure, determine whether a menu application, Menu, of the device processor 12 is triggered.

Step S804: If the menu application of the device processor 12 is not triggered, the device processor 12 receives the touch information, forwards the touch information to the second interface 18, and sends touch data (including the identification information and the touch information) to the first control unit MCU1 and the second control unit MCU2 through the second interface 18.

Step S805: The first control unit MCU1 and the second control unit MCU2 send the touch data to corresponding channel modules according to the identification information, for example, one or more modules of channel module A, channel module B, channel module C, and channel module D.

Step S806: If the menu application of the device processor 12 has been triggered, the device processor 12 disables a data forwarding function of the second interface 18, and the device processor 12 receives the touch data through the first interface 17 and processes the touch data. After the menu application of the device processor 12 exits, restore the data forwarding function of the second interface 18, and then steps S805 and S806 are executed, that is, the device processor 12 forwards the touch data to the second interface 18, and then sends the identification information and touch data to the first control unit MCU1 and the second control unit MCU2 through the second interface 18, and the first control unit MCU1 and the second control unit MCU2 send the touch data to the corresponding channel modules according to the identification information.

The interactive white board of this embodiment can avoid drawing a trajectory due to a touch event. Multi-module interactive white board usually uses the Android system as the master system. When a non-master system channel (such as a PC channel, an HDMI channel, a VGA channel, etc.) is displayed, the master system will start a window (such as a TV setting window), which is configured to display the content to be displayed. When the content of the non-master system channel is displayed through the window, if the menu application of the master system (such as the menu application, Menu) is triggered, the menu application, Menu, will be overlaid on the TV setting window, and thus the underlying TV setting window will also generate touch data in a corresponding area when the user touches the Menu of the menu application of the master system and, especially when the whiteboard software is opened in the TV setting window, a trajectory will be drawn in the whiteboard software due to the touch of the Menu of the menu application of the master system. When the interactive white board of this embodiment detects that the current system is in a non-master system channel, that is, channel module A, channel module B, channel module C, and/or channel module D, it further determines whether the menu application of the device processor 12 is triggered. If the menu application of the device processor 12 has been triggered, the device processor 12 disables the data forwarding function of the second interface 18. The device processor 12 receives the touch data through the first interface 17 and processes the touch data. At this time, the touch data from touching the menu application Menu of the master system will only be sent to the device processor 12, and the device processor 12 will process and respond. The touch data from touching the menu application Menu of the master system will not be sent to non-master system channels such as the channel module A, channel module B, channel module C and/or channel module D, thereby avoiding drawing the trajectory in the TV setting window, thereby avoiding the impact on the non-master system channels, and achieving more convenient, accurate and rapid use. When the menu application of the device processor 12 exits, the data forwarding function of the second interface 18 is restored, so that the channel module A, channel module B, channel module C and/or channel module D can be used normally again.

According to an embodiment of the present disclosure, a computer storage medium is provided. The computer storage medium includes a stored program, where when the program is running, an interactive white board in which the storage medium is located is controlled to perform the following steps: receiving first touch data generated by a touch component; marking the first touch data according to a current display channel of the interactive white board to generate second touch data, where the second touch data includes an identifier corresponding to the current display channel; sending the second touch data to a corresponding control unit according to the identifier corresponding to the current display channel; receiving the second touch data and making a touch response.

In the above-mentioned embodiments of the present disclosure, the description of each embodiment has its own focus. For parts that are not described in detail in an embodiment, reference may be made to related descriptions of other embodiments.

In the several embodiments provided in the present disclosure, it should be understood that the disclosed technical content can be implemented in other ways. The device embodiments described above are merely illustrative. For example, the division of the units can be a logical function division, and there can be other divisions in actual implementation, for example, multiple units or components can be combined or integrated into another system, or some features can be ignored or not implemented. In addition, the displayed or discussed mutual coupling or direct coupling or communication connection may be indirect coupling or communication connection through some interfaces, units or modules, and may be in electrical or other form.

The units described as separate components may or may not be physically separated, and the components displayed as units may or may not be physical units, that is, they may be located in one place, or they may be distributed on multiple units. Some or all of the units may be selected according to actual needs to achieve the objectives of the solutions of the embodiments.

In addition, the functional units in each embodiment of the present disclosure may be integrated into one processing unit, or each unit may exist alone physically, or two or more units may be integrated into one unit. The above-mentioned integrated unit can be implemented in the form of hardware or software functional unit.

If the integrated unit is implemented in the form of a software functional unit and sold or used as an independent product, it can be stored in a computer readable storage medium. Based on this understanding, the technical solutions of the present disclosure essentially or the part that contributes to the prior art or all or part of the technical solutions can be embodied in the form of a software product, and the computer software product is stored in a storage medium which includes several instructions enabling a computer device (which can be a personal computer, a server, or a network device, etc.) to execute all or part of the steps of the method described in each embodiment of the present disclosure. The aforementioned storage media includes: a U disk, a read-only memory (ROM, Read-Only Memory), a random access memory (RAM, Random Access Memory), a mobile hard disk, a magnetic disk or an optical disk and other media on which program codes can be stored.

The above description is only preferred embodiments of the present disclosure. It should be pointed out that for those of ordinary skill in the art, without departing from the principle of the present disclosure, several improvements and modifications can be made, and these improvements and modifications should also be regarded as the scope of protection of the present disclosure.

What is claimed is:

1. An interactive white board, comprising: a touch component, a device processor, a first control unit, and a plurality of first channel modules, wherein the touch component is connected to the device processor, the device processor is connected to the touch device and the first control unit, and the first control unit is connected to the device processor and the plurality of first channel modules, wherein:
    the touch component is configured to generate first touch data and send the first touch data to the device processor;
    the device processor is configured to mark the first touch data according to a current display channel to generate second touch data and send the second touch data to the first control unit, wherein the second touch data comprises an identifier corresponding to the current display channel, wherein to mark the first touch data according to the current display channel to generate second touch data and send the second touch data to the first control unit, the device processor is further configured to:
    detect whether the display channel changes, wherein the display channel changes when the interactive white board switches a channel module;
    if the display channel changes, detect whether a last set of touch data before the display channel changes is in its integrity; and
    if the last set of touch data before the display channel changes is not in its integrity, use supplementary points to supplement an end point of the last set of touch data before the display channel changes and a start point of a first set of touch data after the display channel changes, wherein the supplementary points are first touch points after the display channel changes;
    determine, according to the current display channel of the interactive white board, the identifier for marking the first touch data; and
    place the identifier into a data packet of the first touch data, and marking the first touch data according to the identifier to generate the second touch data;
    the first control unit is configured to send the second touch data to a corresponding one of the plurality of the first channel modules according to the identifier corresponding to the current display channel; and
    the first channel module is configured to receive the second touch data through the corresponding display channel and make a touch response.

2. The interactive white board according to claim 1, further comprising:
    at least one second control unit, wherein the second control unit is connected in series with the first control unit, and the second control unit is connected to a plurality of second channel modules through corresponding display channels;
    wherein the first control unit is further configured to send the second touch data to the second control unit when the display channel corresponding to the second touch data is a display channel of any one of the plurality of the second channel modules, and the second control unit is configured to send the received second touch data to a corresponding one of the plurality of the second channel modules.

3. The interactive white board according to claim 1, further comprising:
    at least one second control unit, wherein the second control unit is connected in parallel with the first control unit, and the second control unit is also connected to a plurality of second channel modules through corresponding display channels; wherein the first control unit is further configured to send the second touch data to the second control unit when the display channel corresponding to the second touch data is a display channel of any one of the plurality of the second channel modules, and the second control unit is configured to send the received second touch data to a corresponding one of the plurality of the second channel modules.

4. The interactive white board according to claim 1, wherein the identifier comprises at least one byte, and a bit of the byte corresponds to one of the first channel modules.

5. The interactive white board according to claim 1, wherein the device processor comprises a first interface which is connected to the touch component and a second interface which is connected to the first control unit, wherein the device processor is further configured to:
    if a menu application of the device processor is triggered to display, disable a data forwarding function of the second interface, receive, through the first interface, touch information sent by the touch component and process the touch information; and
    after the menu application of the device processor exits, restore the data forwarding function of the second interface.

6. The interactive white board according to claim 1, wherein the touch component is one of electromagnetic touch component, infrared touch component, or capacitive touch component, and the first channel is one of a PC module, an Android module or an output module.

7. An interactive white board, comprising: a touch device, a component processor, a first control unit and first channel modules, wherein the device processor comprises a first interface which is connected to the touch component and a second interface which is connected to the first control unit; the first control unit is connected to the device processor and the first channel modules, wherein:

the touch component is configured to generate first touch data and send the first touch data to the device processor;

when a current system is in a channel of the device processor, the device processor is configured to receive through the first interface the first touch data sent by the touch component and respond to the first touch data; and when the current system is in a channel of the first channel modules, the device processor is configured to receive the first touch data sent by the touch component through the first interface, mark the first touch data according to a current display channel to generate second touch data, forward the second touch data to the second interface, and send the second touch data to the first control unit through the second interface, wherein to mark the first touch data according to the current display channel to generate second touch data and send the second touch data to the first control unit, the device processor is further configured to:

detect whether the display channel changes, wherein the display channel changes when the interactive white board switches a channel module;

if the display channel changes, detect whether a last set of touch data before the display channel changes is in its integrity; and     if the last set of touch data before the display channel changes is not in its integrity, use supplementary points to supplement an end point of the last set of touch data before the display channel changes and a start point of a first set of touch data after the display channel changes, wherein the supplementary points are first touch points after the display channel changes;

determine, according to the current display channel of the interactive white board, an identifier for marking the first touch data; and     place the identifier into a data packet of the first touch data, and marking the first touch data according to the identifier to generate the second touch data;

wherein the second touch data comprises the identifier corresponding to the current display channel, the first control unit is configured to send the second touch data to a corresponding one of the first channel modules according to the identifier corresponding to the current display channel; and     the first channel module is configured to receive the second touch data through the corresponding display channel and make a touch response.

8. The interactive white board according to claim 7, wherein the device processor is further configured to:

if a menu application of the device processor is touched for display, disable a data forwarding function of the second interface, and receive, through the first interface, touch information sent by the touch component and process the touch information; and after the menu application of the device processor exits, restore the data forwarding function of the second interface.

9. A data processing method applied in an interactive white board, comprising:

receiving first touch data generated by a touch component;

marking the first touch data according to a current display channel of the interactive white board to generate second touch data, wherein the second touch data comprises an identifier corresponding to the current display channel, and wherein the marking the first touch data according to the current display channel of the interactive white board to generate the second touch data further comprises:

detecting whether the display channel changes, wherein the display channel changes when the interactive white board switches a channel module;

if the display channel changes, detecting whether a last set of touch data before the display channel changes is in its integrity; and     if the last set of touch data before the display channel changes is not in its integrity, using supplementary points to supplement an end point of the last set of touch data before the display channel changes and a start point of a first set of touch data after the display channel changes, wherein the supplementary points are first touch points after the display channel changes;

determining, according to the current display channel of the interactive white board, the identifier for marking the first touch data; and     placing the identifier into a data packet of the first touch data, and marking the first touch data according to the identifier to generate the second touch data; and     sending the second touch data to a corresponding channel module according to the identifier corresponding to the current display channel; and     receiving the second touch data and making a touch response.

10. The method according to claim 9, wherein the receiving the first touch data generated by the touch component further comprises:

enumerating the touch component;

selecting data generated by the touch component out of the received data according to a device identifier of the touch component; and     selecting, according to characteristic information of touch data, the touch data out of the data generated by the touch component as the first touch data.

11. The method according to claim 9, wherein the sending the second touch data to the corresponding channel module according to the identifier corresponding to the current display channel comprises:

sending the second touch data to a data queue of the channel module; and     sequentially distributing the second touch data in the data queue to the channel module.

12. A data processing method applied in an interactive white board, comprising:

receiving first touch data generated by a touch component;

marking the first touch data according to a current display channel of the interactive white board to generate second touch data, wherein the second touch data comprises an identifier corresponding to the current display channel, and wherein the marking the first touch data according to the current display channel of the interactive white board to generate the second touch data further comprises:

determining, according to the current display channel of the interactive white board, the identifier for marking the first touch data, and placing the identifier into a data packet of the first touch data, and marking the first touch data according to the identifier to generate the second touch data, wherein the determining, according to the current display channel of the interactive white board, the identifier for marking the first touch data is specifically:
acquiring a target bit corresponding to the current display channel of the interactive white board, wherein the identifier comprises at least one byte, and each bit of the byte corresponds to a display channel; and
setting a value of the target bit in the identifier to be opposite to a value of a remaining bit to generate the identifier for marking the first touch data.

13. A data processing method applied in an interactive white board, wherein the interactive white board comprises: a touch component, a device processor, a first control unit, and first channel modules, wherein the device processor comprises a first interface which is connected to the touch component and a second interface which is connected to the first control unit, and the first control unit is connected to the device processor and the first channel modules, the method comprising:
generating, by the touch component, first touch data and sending the first touch data to the device processor;
if a current system is in a channel of the device processor, receiving, by the device processor, through the first interface the first touch data sent by the touch component and responding to the first touch data;
if the current system is in a channel of the first channel modules, receiving, by the device processor, through the first interface the first touch data sent by the touch component, marking the first touch data according to a current display channel to generate second touch data, and forwarding the second touch data to the second interface, and through sending, by the second interface, the second touch data to the first control unit, wherein the marking the first touch data according to the current display channel of the interactive white board to generate the second touch data further comprises:
detecting whether the display channel changes, wherein the display channel changes when the interactive white board switches a channel module;
if the display channel changes, detecting whether a last set of touch data before the display channel changes is in its integrity; and
if the last set of touch data before the display channel changes is not in its integrity, using supplementary points to supplement an end point of the last set of touch data before the display channel changes and a start point of a first set of touch data after the display channel changes, wherein the supplementary points are first touch points after the display channel changes;
determining, according to the current display channel of the interactive white board, an identifier for marking the first touch data;
placing the identifier into a data packet of the first touch data, and marking the first touch data according to the identifier to generate the second touch data, wherein the second touch data comprises the identifier corresponding to the current display channel; and
sending, by the first control unit, the second touch data to a corresponding one of the first channel modules according to the identifier corresponding to the current display channel; and
receiving, by the first channel module, the second touch data through the corresponding display channel and making a touch response.

14. The method according to claim 13, further comprising: at least one second control unit connected in series with the first control unit, and the second control unit is connected to second channel modules through corresponding display channels;
wherein the first control unit sends the second touch data to the second control unit when the display channel corresponding to the second touch data is a display channel of any one of the second channel modules;
the second control unit sends the received second touch data to a corresponding one of the second channel modules; and
a connection mode between the second control unit and the first control unit is in series connection or parallel connection.

15. The method according to claim 14, further comprising:
if a menu application of the device processor is touched for display, disabling, by the device processor, a data forwarding function of the second interface, receiving, through the first interface, touch information sent by the touch component and processing the touch information; and
after the menu application of the device processor exits, restoring the data forwarding function of the second interface.

16. The method according to claim 13, wherein the generating, by the touch component, first touch data further comprises:
enumerating the touch component;
selecting data generated by the touch component out of the received data according to a device identifier of the touch component; and
selecting, according to characteristic information of touch data, the touch data out of the data generated by the touch component as the first touch data.

17. The method according to claim 13,
wherein the identifier comprises at least one byte, and a bit of the byte corresponds to one of the first channel modules.

18. The method according to claim 13, wherein the touch component is one of electromagnetic touch component, infrared touch component or capacitive touch component, and the first channel is one of a PC module, an Android module or an output module.

* * * * *